Patented Apr. 9, 1946

2,397,927

UNITED STATES PATENT OFFICE 2,397,927

AZO COMPOUNDS

Joseph B. Dickey and James G. McNally, Rochester, N. Y., assignors to Eastman Kodak Company, Rochester, N. Y., a corporation of New Jersey No Drawing. Application September 17, 1942, Serial No. 458,722

4 Claims. (Cl. 260—199)

This invention relates to new azo compounds and their application to the art of dyeing or coloring. Textile materials such as organic derivatives of cellulose, wool, silk and nylon, for example, can be colored. Coloration can be effected by dyeing, printing, stencilling or other suitable methods.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

It is an object of our invention to provide new azo compounds. Another object of our invention is to provide colored textile materials which are of good fastness to light, washing and gas fading. A further object is to provide a process for the direct coloration of organic derivatives of cellulose, wool, silk and nylon textile materials. A particular object of our invention is to provide new nuclear non-sulfonated azo compounds suitable for the coloration of cellulose acetate. A still further object is to provide a satisfactory process for the preparation of the new azo compounds of the invention.

The azo compounds, by means of which the above objects are accomplished or made possible, consist of the azo compounds having the formula:

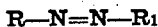

wherein R stands for the residue of a member selected from the group consisting of a benzene nucleus, an azobenzene nucleus, a benzothiazole nucleus and a benzoxazole nucleus, R₁ stands for the residue of a member selected from the group consisting of a benzene nucleus and a naphthalene nucleus, said member R₁ containing a member selected from the group consisting of a —CH₂CHO, a

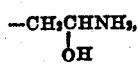

a

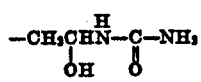

and a

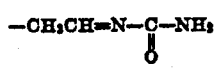

group joined directly through a nitrogen atom to its nucleus and wherein the azo bond shown is attached directly to the nucleus of the members R and R₁.

While our invention relates broadly to the azo compounds having the above formula, ordinarily the azo compounds of the invention are nuclear non-sulfonated compounds having the formula:

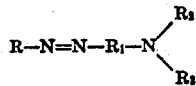

wherein R stands for the residue of a member selected from the group consisting of a benzene nucleus, an azobenzene nucleus, a benzothiazole nucleus and a benzoxazole nucleus, R₁ stands for the residue of a member selected from the group consisting of a benzene nucleus and a naphthalene nucleus, R₂ stands for a member selected from the group consisting of a —CH₂CHO, a

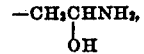

a

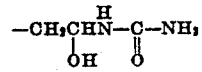

and a

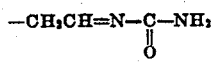

group, R₃ stands for a member selected from the group consisting of hydrogen, an alkyl group, a hydroxyalkyl group, an alkoxyalkyl group, a cycloalkyl group, a furfuryl group, a benzene nucleus, a short chain unsaturated hydrocarbon group whose unsaturation consists of a double bond, an alkyl group in salt form, a —CH₂CHO, a

a

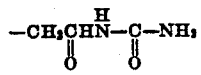

and a

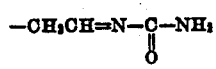

group wherein the

grouping is attached to the member $R_1$ in para position to the azo bond shown and wherein the azo bond shown is attached directly to the nucleus of the members R and $R_1$.

Generally speaking, compounds wherein R and $R_1$ are benzene nuclei are advantageous, particularly insofar as the dyeing of cellulose acetate is concerned. Again, $R_3$ is normally hydrogen or an alkyl or substituted alkyl group. Dyeings with compounds wherein $R_2$ contains an —$NH_2$ group possess increased resistance to what is known in the art as "gas fading."

The new azo dye compounds of our invention can be prepared by diazotizing an arylamine of the benzene series, an aminoazobenzene, an aminobenzothiazole or an aminobenzoxazole and coupling the diazonium compound obtained with a benzene or naphthalene compound, capable of coupling, having a —$CH_2CHO$, a

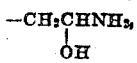

a

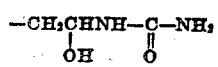

or a

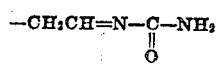

group joined directly thereto through a nitrogen atom.

As will be apparent from the examples given hereinafter, the member R can have substituents such as a nitro group, a halogen atom, an alkyl group, an alkoxy group, a cyano group, a hydroxy group, a keto group, a sulfoneamide group, an alkylsulfone group and an acylamino group. Similarly, the member $R_1$ can have substituents such as a halogen atom, an alkyl group, an alkoxy group, a hydroxy group and an acylamino group.

Illustrative of alkyl may be mentioned methyl, ethyl, propyl, butyl, amyl, hexyl, octyl, decyl and cetyl. Illustrative of hydroxyalkyl may be mentioned β-hydroxyethyl, β-hydroxypropyl, β,γ-dihydroxypropyl, γ-hydroxypropyl, and Δ-hydroxybutyl, β-methoxyethyl, β-ethoxyethyl, γ-methoxypropyl, γ-ethoxypropyl, β-methoxy-β-ethoxyethyl and β-ethoxy-β-ethoxyethyl are representative of alkoxyalkyl. Illustrative cycloalkyl groups include cyclobutyl, cyclohexyl and cycloheptyl while furfuryl, 5-ethylfurfuryl, 5-β-hydroxyethylfurfuryl, tetrahydrofurfuryl, 5-ethyltetrahydrofurfuryl and 5-β-hydroxyethyltetrahydrofurfuryl are representative of "a furfuryl group." Illustrative short chain unsaturated hydrocarbon groups include allyl and vinyl. By "an alkyl group in salt form" is meant alkyl groups such as β-sulfoethyl, β-sulfatoethyl, γ-sulfopropyl, γ-sulfatopropyl, β-phosphatoethyl, γ-phosphatopropyl, β-phosphitoethyl, γ-phosphatopropyl,

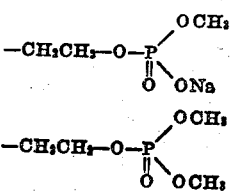

and

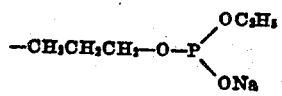

Both sulfonated and non-sulfonated compounds are included within the scope of our invention. The nuclear nonsulfonated compounds have been found to be especially of value for the dyeing of organic derivatives of cellulose, particularly cellulose acetate and it is to these compounds and their application for the dyeing of organic derivatives of cellulose that our invention is especially directed. The nuclear non-sulfonated compounds likewise possess some application for the dyeing of wool, silk and nylon.

The nuclear sulfonated compounds of our invention have little or no utility for the dyeing of organic derivatives of cellulose but possess application for the dyeing of wool, silk and nylon. Preferably when the dye compounds of the invention are to be employed for the coloration of organic derivatives of cellulose, they should contain no nuclear free carboxylic acid group. Blue, orange, pinkish-red, red and rubine colors, for example, can be obtained using the dye compounds of the invention.

The following examples illustrate the preparation of the azo dye compounds of our invention:

*Example 1*

0.1 (13.8 grams) gram mole of p-nitroaniline is added to 200 cc. of water and 40 cc. of 36% hydrochloric acid. The mixture resulting is cooled to a temperature approximating 0–5° C. and the p-nitroaniline is diazotized while maintaining this temperature by adding, with stirring, a water solution of 6.9 grams of sodium nitrite.

0.1 gram mole of N-[β-hydroxyethyl-β-carbamylamino-β-hydroxyethyl]aniline is dissolved in dilute hydrochloric acid, the resulting solution is cooled to 0–10° C. and the diazonium solution prepared as described above is added with stirring. Following the addition of the diazo solution, the mixture resulting is permitted to stand for 30 minutes after which it is slowly made neutral to Congo red paper by the addition of sodium acetate. Upon completion of the coupling reaction which takes place, the dye compound formed is recovered by filtration, washed with water and dried. The dye compound obtained colors cellulose acetate silk, wool, silk and nylon red shades having improved gas fastness properties.

*Example 2*

100 grams of

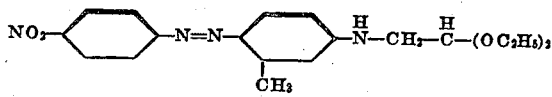

are dissolved in 1 liter of ethyl alcohol, 500 cc. of water and 200 cc. of 36% hydrochloric acid. The resulting mixture is heated on a steam bath at 90° C. for 6 hours following which the acid present is neutralized by the addition of a salt such as sodium acetate or sodium bicarbonate. Following neutralization of the reaction mixture, water is added and the dye compound which precipitates out and which has the formula:

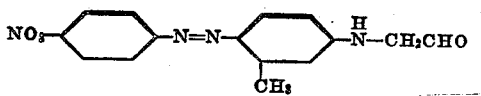

is recovered by filtration, washed with water and dried. This dye compound colors cellulose acetate silk, wool, silk and nylon red.

The starting compound of this example can be prepared as described in Example 1 of McNally and Dickey U. S. Patent 2,234,703, issued March 11, 1941 by substituting the diethylacetal of 3- methylphenylaminoacetaldehyde for the diethylacetal of phenylaminoacetaldehyde of the example. It should be here noted that compounds of the invention having a —CH₂CHO grouping attached to the nitrogen atom of the coupling component can be prepared from the acetal in accordance with the process described in this example. It will be understood that where it is desired to have two —CH₂CO groups attached to the nitrogen atom such compounds can be prepared by preparing compounds having two acetal groupings attached to the nitrogen such as is shown in the tabulation on page 4 (compound No. 18) of the above-identified McNally and Dickey patent.

The dye compound of this example can also be prepared by coupling diazotized p-nitroaniline with 3-methylphenylaminoacetaldehyde. Coupling and recovery of the dye compound can be carried out in accordance with the procedure described in Example 1.

*Example 3*

0.1 gram mole of the dye

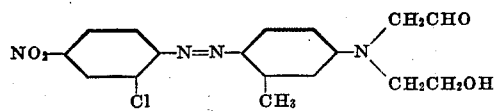

0.2 gram of barium hydroxide, 0.1 gram mole of urea and 50 cc. of water are warmed together at 25–35° C. until the reaction which takes place is complete. The end point is determined by means of the Tollen's reagent test. Upon standing, the dye having the formula

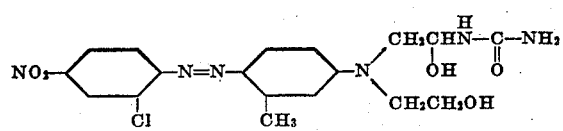

is formed and is recovered by filtration, washed with water and dried. This dye compound colors cellulose acetate silk, wool, silk and nylon rubine.

On heating the dye compound above described, a dye having the formula

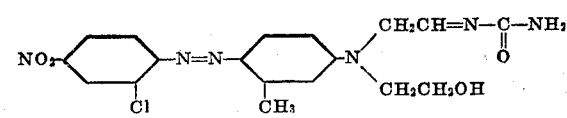

is formed. If desired, the heating can be carried out with the dye compound on the fiber. The dye compound obtained on heating similarly colors cellulose acetate, wool, silk and nylon rubine.

*Example 4*

.1 gram mole of 1-amino-2-chloro-4-nitrobenzene is diazotized and the diazonium compound obtained is coupled with .1 gram mole of 1-N-[β-carbamylamino-β-hydroxy]ethyl-5- hydroxynaphthalene. The diazotization, coupling and recovery reactions can be carried out in accordance with the procedure described in Example 1. The dye compound obtained colors cellulose acetate, wool, silk and nylon blue.

The coupling component employed in the preparation of the dye of this example can be obtained by hydrolysis of the diethylacetal of 5-hydroxynaphthylaminoacetaldehyde in accordance with the procedure described in Example 2 and treating the compound thus obtained with urea in accordance with the procedure described in Example 3.

*Example 5*

0.1 gram mole of the dye

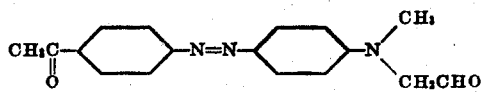

is dissolved in 500 cc. of ethyl alcohol and more than .1 gram mole of liquid ammonia is added to the reaction mixture. It will be understood that the reaction with the liquid ammonia is conducted in a suitable reaction vessel. Upon completion of the reaction which takes place between the dye compound and the liquid ammonia, the alcohol present is distilled off under reduced pressure following which the dye compound formed is recovered from the reaction mixture. The dye compound obtained has the formula:

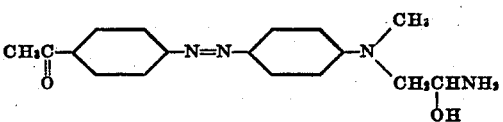

and colors cellulose acetate, wool, silk and nylon orange.

The dye compound of this example can also be prepared by coupling diazotized p-aminoacetophenone with

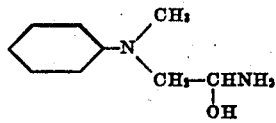

*Example 6*

.1 gram mole (21.7 grams) of 1-amino-2-bromo-4-nitrobenzene is diazotized and the diazonium compound obtained is coupled with .1 gram of

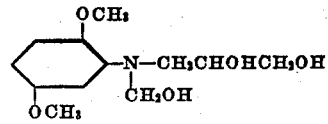

Coupling and recovery of the dye compound formed can be carried out in accordance with the procedure described in Example 1. The dye compound obtained colors cellulose acetate, wool, silk and nylon rubine.

The coupling component of this example can be prepared by reacting BrCH₂CH—(OC₂H₅)₂ with 2,5-dimethoxy-N-mono-β,γ-dihydroxypropylaniline and converting the compound thus obtained to the aldehyde form by the procedure described in Example 2.

*Example 7*

.1 gram mole (18 grams) of 2-amino-6-methoxybenzothiazole is diazotized and the diazonium compound obtained is coupled with .1 gram mole of

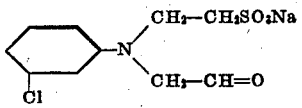

Coupling and recovery of the dye compound formed can be carried out in accordance with the general method described in Example 1. A salt such as sodium chloride can be added, if desired, to facilitate precipitation of the dye compound. The dye compound obtained colors cellulose acetate, wool, silk and nylon red.

.1 gram mole of 2-amino-6-methoxybenzoxazole can be substituted for the 2-amino-6-methoxybenzothiazole of the example to obtain a dye compound which colors the materials above named red.

Example 8

.1 gram mole (18.3 grams) of 1-amino-2,4-dinitro-benzene is diazotized and the diazonium compound obtained is coupled with .1 gram mole of

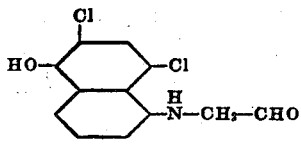

The dye compound obtained colors cellulose acetate, wool, silk and nylon blue.

Example 9

.1 gram mole (21.7 grams) of 1-amino-2,4-dinitro-6-chlorobenzene is diazotized and the diazonium compound obtained is coupled, after neutralization of the diazonium reaction mixture, with .1 gram mole of

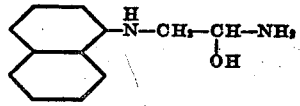

The dye compound obtained colors cellulose acetate, wool, silk and nylon blue.

Following the procedure described in the foregoing examples, the dye compounds having the formulas given hereinafter can be prepared. The colors which these dye compounds yield on the textile materials which they are adapted to color have likewise been given:

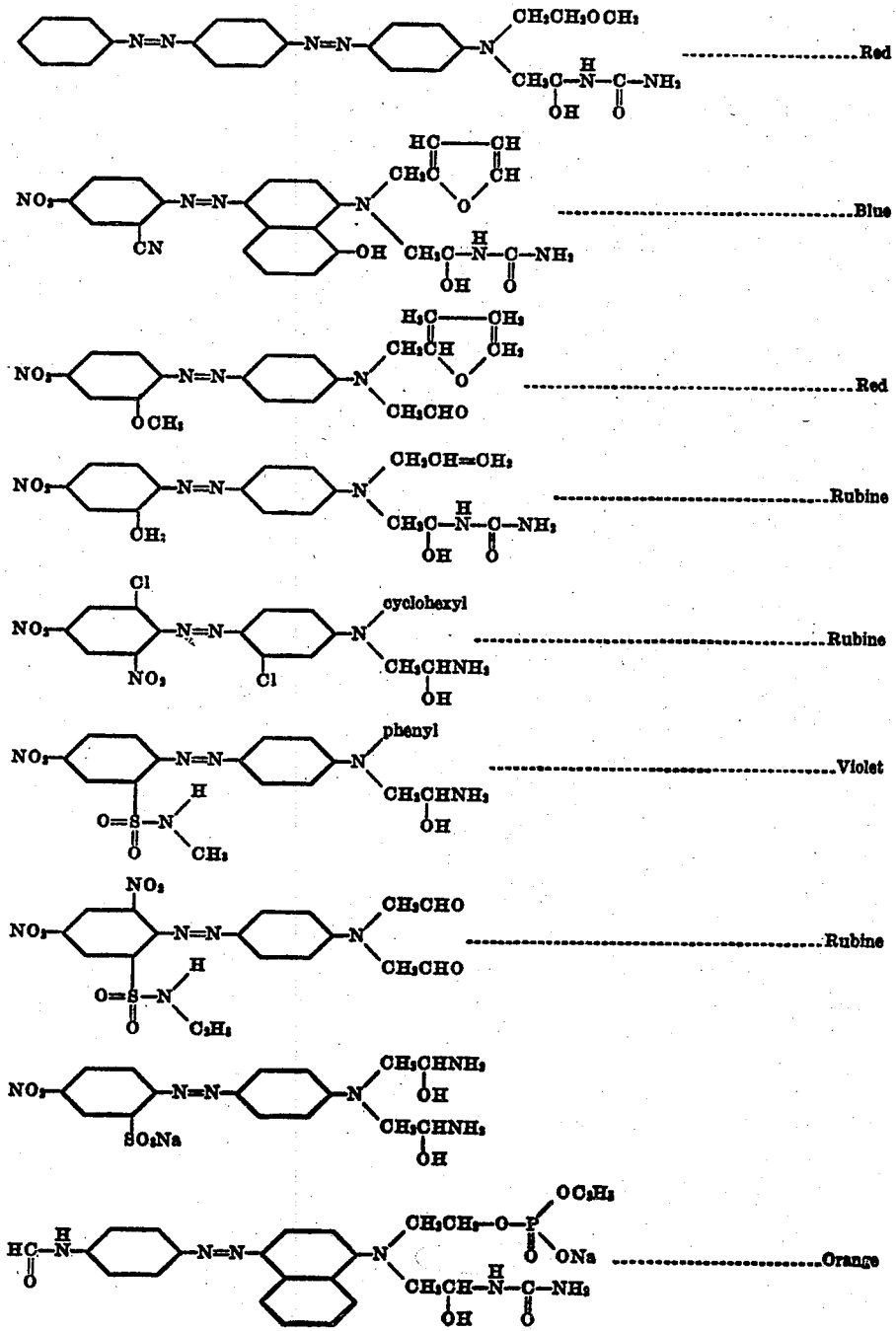

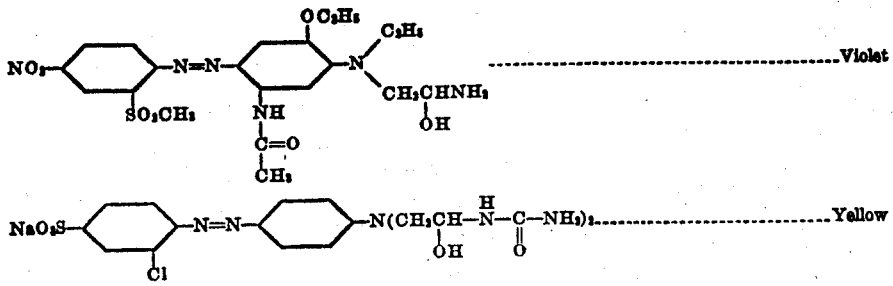  ............Violet

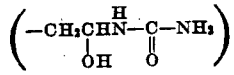  ............Yellow

It will be understood that the foregoing examples are intended to be illustrative and not limitative of our invention. As will be apparent to those skilled in the art, any of the diazonium components disclosed herein can be coupled with any of the coupling components disclosed herein to yield dye compounds of the invention. Additional amine compounds, the diazonium compounds of which can be coupled with the coupling components indicated herein to yield dye compounds of the invention, include 1-amino-2-hydroxy-4-nitrobenzene, 1 - amino-4-acetaminobenzene, m-sulfanilic acid, p-sulfanilic acid, 2-aminobenzoxazole, 2 - aminobenzothiazole, 4-amino-3-nitrobenzenesulfonic acid, 4-amino-3-chlorobenzene sulfonic acid, 2-amino-5-bromobenzene sulfonic acid, 1-naphthylamine-3-sulfonic acid, 1-naphthylamine-5-sulfonic acid, 1-naphthylamine-6-sulfonic acid, 1 - amino-8-naphthol-3,6-disulfonic acid, 1-naphthylamine-4,6-disulfonic acid, 1-naphthylamine-4,8-disulfonic acid, 1-naphthylamine-7-sulfonic acid, 4'-nitro-4-aminoazobenzene and 4'-sulfo-4-aminoazobenzene. It will be understood that compounds containing a (β-carbamylamino-β-hydroxy)ethyl group

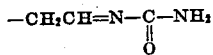

can be prepared from the corresponding compounds containing a —CH₂CHO group by treatment of these latter compounds with urea in accordance with the instructions given in Example 3. Similarly, the compounds containing a $$-CH_2CH=N-C-NH_2$$
$$\phantom{-CH_2CH=N-}\|$$
$$\phantom{-CH_2CH=N-}O$$

group can be prepared by heating the corresponding dye compounds containing a (β-carbamylamino-β-hydroxy)ethyl group. These latter compounds can also be obtained by heating coupling components containing a (β-carbamylamino-β-hydroxy)ethyl group and coupling the compounds thus obtained with the diazonium compounds indicated herein. Lastly, compounds containing a

group can be obtained by treating the corresponding compounds containing a —CH₂CHO group with ammonia in accordance with the procedure described in Example 5. We would here note that the fastness to washing of the dye compounds containing a —CH₂CHO group can be improved by treatment of the dyed fabric with a diamine such as ethylenediamine and the methylated and ethylated derivatives of ethylenediamine or by treatment of the dyed fabric with urea or a like compound.

The azo compounds of our invention are, for the most part, relatively insoluble in water and, accordingly, they may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents together with the amounts that may be employed are disclosed in McNally and Dickey Patent No. 2,115,030, issued April 26, 1938. The process disclosed in this patent for the dyeing of cellulose acetate silk can be used in applying the dyes of the present application to this material.

It will be understood that textile materials prepared from other organic derivatives of cellulose, wool, silk, or nylon, or mixtures of these materials, can be directly colored from an aqueous dyebath in a similar manner as cellulose acetate. However, other suitable methods for the dyeing of these materials are known to those skilled in the art and these methods, of course, can be used in applying the dye compounds of this invention if desired.

It is here noted that the term "Nylon" refers to a linear polyamide resin which is believed to be basically described or claimed in U. S. Letters Patent No. 2,071,250, issued February 16, 1937, to Wallace M. Carothers.

We claim:

1. The monoazo compounds having the general formula:

$$R-N=N-R_1$$

wherein R represents a monocyclic aryl nucleus of the benzene series containing a nitro group in para position to the azo bond, R₁ represents a member selected from the group consisting of a monocyclic aryl nucleus of the benzene series containing an

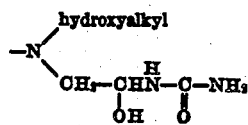

group in para position to the azo bond and a monocyclic naphthalene nucleus containing an

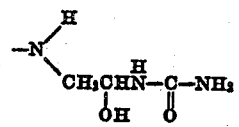

group in its 1-position and a hydroxy group in its 5-position and wherein the members R and R₁ are attached to the azo bond through a nuclear carbon atom.

2. The azo compound having the formula:

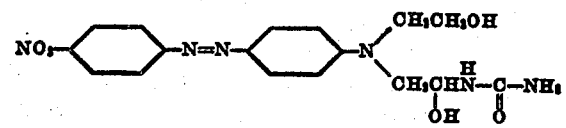

3. The azo compound having the formula:

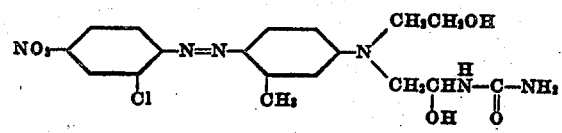

4. The azo compound having the formula:

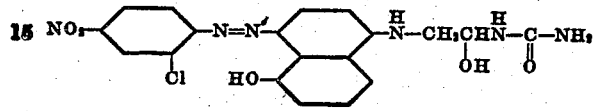

JOSEPH B. DICKEY.
JAMES G. McNALLY.